(12) United States Patent
Blessing et al.

(10) Patent No.: US 7,884,518 B2
(45) Date of Patent: Feb. 8, 2011

(54) ELECTRICAL SYNCHRONOUS MACHINE

(75) Inventors: Uli Christian Blessing, Heilbronn (DE); Alexander Kreim, Bretzfeld-Waldbach (DE); Ulrich Knoedel, Ingersheim (DE); Matthias Beck, Heilbronn (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 12/326,022

(22) Filed: Dec. 1, 2008

(65) Prior Publication Data
US 2009/0140591 A1    Jun. 4, 2009

Related U.S. Application Data

(63) Continuation of application No. PCT/EP2007/003698, filed on Apr. 26, 2007.

(30) Foreign Application Priority Data

May 31, 2006    (DE) .................. 10 2006 026 593

(51) Int. Cl.
*H02K 16/00* (2006.01)
*H02K 16/02* (2006.01)
*H02K 33/00* (2006.01)
*H02K 35/00* (2006.01)

(52) U.S. Cl. .................. 310/114; 310/36; 310/154.33; 310/156.37; 310/156.36; 310/120; 310/126

(58) Field of Classification Search .................. 310/36, 310/114, 154.33, 156.37, 156.36, 120, 126; *H02K 16/00, H02K 16/02, 33/00, 35/00*
See application file for complete search history.

(56) References Cited

U.S. PATENT DOCUMENTS

| | | | |
|---|---|---|---|
| 4,562,367 A | 12/1985 | Kumatani | |
| 5,076,755 A * | 12/1991 | Okada | .......................... 415/17 |
| 5,281,879 A * | 1/1994 | Satake et al. | ................. 310/114 |
| 5,821,710 A * | 10/1998 | Masuzawa et al. | ..... 318/400.41 |
| 5,994,809 A * | 11/1999 | Ackermann | .................. 310/103 |
| 6,175,178 B1 * | 1/2001 | Tupper et al. | ................ 310/166 |
| 6,320,488 B1 | 11/2001 | Leupold | |
| 6,844,647 B2 | 1/2005 | Horber | |
| 6,975,055 B2 * | 12/2005 | Joong et al. | ............. 310/156.01 |

(Continued)

FOREIGN PATENT DOCUMENTS

CN    1373545    10/2002

(Continued)

*Primary Examiner*—Quyen Leung
*Assistant Examiner*—John K Kim
(74) *Attorney, Agent, or Firm*—Knobbe, Martens, Olson & Bear, LLP (57) ABSTRACT

An electrical synchronous machine, in particular for use as a drive machine in motor vehicle applications. A stator has an electrical winding arrangement for generating a rotating field. A rotor has magnetic flux generating means for generating a rotor flux with which the rotating field interacts.

The rotor has a first rotor section with first magnetic flux generating means and a second rotor section with magnetic flux influencing means. It is possible to move the two rotor sections relative to one another between at least a first and a second relative position in such a way that the rotor flux provided by the rotor has a different magnitude in the two relative positions.

20 Claims, 6 Drawing Sheets

U.S. PATENT DOCUMENTS

| | | | |
|---|---|---|---|
| 2002/0117933 A1* | 8/2002 | Joong et al. | 310/261 |
| 2004/0041485 A1* | 3/2004 | Horber | 310/156.43 |
| 2004/0080237 A1* | 4/2004 | Han et al. | 310/266 |
| 2004/0131984 A1* | 7/2004 | Satek et al. | 431/4 |
| 2005/0275295 A1* | 12/2005 | Horiike | 310/49 R |
| 2006/0131984 A1* | 6/2006 | Han et al. | 310/261 |
| 2006/0290219 A1* | 12/2006 | Rodger et al. | 310/156.36 |
| 2009/0140591 A1* | 6/2009 | Blessing et al. | 310/156.37 |

FOREIGN PATENT DOCUMENTS

| | | |
|---|---|---|
| DE | 33 23 297 | 2/1984 |
| DE | 34 20 370 | 7/1985 |
| DE | 84 19 864 | 11/1986 |
| DE | 36 09 835 | 9/1987 |
| DE | 197 43 314 | 4/1998 |
| EP | 0 511 796 | 11/1992 |
| EP | 1 239 570 | 9/2002 |
| WO | WO 2004/107539 | 12/2004 |

* cited by examiner

ELECTRICAL SYNCHRONOUS MACHINE

CROSS-REFERENCE TO RELATED APPLICATIONS

This is a Continuation application of International patent application PCT/EP 2007/003698, filed Apr. 26, 2007, which claims the priority of German patent application DE 10 2006 026 593.9, filed May 31, 2006.

BACKGROUND OF THE INVENTION

The present invention relates to an electrical synchronous machine, in particular for use as a drive unit in motor vehicle applications, comprising a stator which has an electrical winding arrangement for generating a rotating field, and comprising a rotor which has magnetic flux generating means for generating a rotor flux with which the rotating field interacts.

In conventional synchronous machines, the rotor flux is generated by poles which are magnetized by DC coils. In this case, the field current is generally transmitted to the rotor via slip rings.

In conventional synchronous machines, the rotating field generated by the stator winding is generated by means of the three phases of rotating current.

However, the rotor flux can also be generated by permanent magnets. A synchronous machine of this type can be constructed without slip rings. In this case, power is supplied to the stator winding generally from control and power electronics which, for example, are supplied with power from a DC voltage supply system (for example an electrical vehicle supply system). Machines of this type are also called electronically commutated DC machines or EC motors. These motors can have a long service life, are generally maintenance-free and can be designed for a high degree of protection. Stepless rotation speed control is generally possible by means of the electronic control system.

Synchronous machines are generally designed for a specific rated rotation speed. The rotor flux generated by the magnetic flux generating means is reduced by electrical field weakening at rotation speeds greater than the rated rotation speed.

Permanent magnet-excited synchronous machines are generally designed for a high torque. In this case, the rotor flux is generally comparatively high. As an alternative, such machines can also be designed for a high rotation speed, the rotor flux then generally being lower.

However, on account of the constant rotor flux, the system is generally fixed to a specific rated operating point. In the case of rotation speeds rising beyond this, electrical field weakening is so great that only a relatively small portion of the power fed to the winding arrangement of the stator is available as drive power. Therefore, a range of very high rotation speeds can generally no longer be used. This is true particularly in the case of synchronous machines in which a high rotor flux is generated by correspondingly designed magnetic flux generating means (for example permanent magnets). If generation of higher rotation speeds, in particular a larger usable rotation speed range, is desired, this can generally be realized only with a lower rotor flux. However, this results in the maximum torque being reduced.

DE 36 09 835 A1 discloses a single-phase motor with a permanent magnet rotor and an electromagnetically excited stator, the rotor having two permanent magnet disks which are seated on the rotor shaft in a rotationally fixed manner at an axial distance from one another and have magnetization directions which are oriented transverse to the rotor axis and parallel to one another.

DE 34 20 370 C2 discloses a further single-phase motor with a two-part rotor which has a permanent magnet rotor inner part which is mounted on a drive shaft in a freely rotating manner, and an electrically conductive rotor outer part.

Document DE 33 23 297 C2 discloses an induction motor with low inertia, a yoke which is rotatably mounted in a frame of the stator and is provided with fan blades being arranged between the stator and rotor.

BRIEF SUMMARY OF THE INVENTION

Against this background, the object of the present invention is to specify an improved synchronous machine which can cover a large rotation speed range and can apply a comparatively high maximum torque.

This object is achieved with the electrical synchronous machine mentioned in the introduction in that the rotor has a first rotor section with first magnetic flux generating means and a second rotor section with magnetic flux influencing means, it being possible to move the two rotor sections relative to one another between at least a first and a second relative position in such a way that the rotor flux provided by the rotor has a different magnitude in the two relative positions.

By virtue of the inventive configuration of a synchronous machine, the rotor flux can accordingly be mechanically varied. Since this causes the two rotor sections to be arranged either in the first or in the second relative position, either a relatively high or a relatively low rotor flux can be provided, so that one relative position is designed for high rotation speeds and the other relative position is designed for high torques.

In this case, the first rotor section generates a rotor flux. The rotor flux generated by the magnetic flux generating means of the first rotor section can be influenced by means of the magnetic flux influencing means such that the rotor flux provided overall by the rotor has a different magnitude in the two relative positions.

Accordingly, the synchronous machine according to the invention can both be operated at high rotation speeds but can also provide a high torque.

In general, the two rotor sections can be moved relative to one another solely between a first and a second relative position. However, it is also possible to configure the two rotor sections such that they can move relative to one another between a plurality of relative positions. It is also feasible to form the two rotor sections such that they can be continuously adjusted between two relative positions, so that an infinite number of relative positions can be set up.

The problem on which the invention is based is fully solved in this way.

The magnetic flux influencing means of the second rotor section may be in the form of magnetic flux damping means which are more effective in one relative position and less effective in the other relative position.

However, it is particularly preferred when the magnetic flux influencing means of the second rotor section are formed by second magnetic flux generating means.

In this way, the installation space taken up by the second rotor section can be used to provide an additional magnetic flux on which the magnetic flux which is provided by the first magnetic flux generating means is superimposed. Therefore, a comparatively high rotor flux can be provided in one of the two relative positions in relation to the installation space used overall.

In general, it is also feasible for the first and/or the second magnetic flux generating means to be formed from slip ring-fed DC coils, that is to say have an electromagnet arrangement.

However, it is particularly advantageous when the first and/or the second magnetic flux generating means each have a permanent magnet arrangement.

In this embodiment, the electrical synchronous machine can be formed without slip rings.

In general, it is also feasible for the first and/or the second magnetic flux generating means to have both an electromagnet arrangement and a permanent magnet arrangement, that is to say exhibit mixed means for magnetic flux generation purposes.

According to a further preferred embodiment, the permanent magnet arrangements are arranged on the first and, respectively, the second rotor section such that the rotor flux is changed during the relative movement by changing the flux density.

From the view of the stator, the rotor flux presents itself substantially as the rotor flux in the air gap. This rotor flux can be calculated in a simplified manner by $\phi = B \cdot Q$, where B is the flux density in the air gap and where Q is the effective cross-sectional area in the air gap.

In the present embodiment, the rotor flux is changed substantially by changing the flux density, it being possible for the cross-sectional area to be substantially constant.

According to an alternative embodiment, the permanent magnet arrangements are arranged on the first and, respectively, the second rotor section such that the rotor flux is changed during the relative movement by changing the air gap area.

In this embodiment, the flux density can remain substantially constant; the change is caused substantially by the change in the effective cross-sectional area.

Overall, it is also preferred when the first rotor section and the second rotor section are arranged so as to be radially interleaved.

A physical arrangement of this kind can generally be realized structurally in a comparatively simple manner.

According to a further preferred embodiment, the first rotor section and the second rotor section are arranged coaxially in relation to one another.

In this way, unbalances on account of the relative movement can be avoided.

Overall, it is also advantageous when the first and, respectively, the second relative position are set up by the first and the second rotor section being rotated with respect to one another.

In this case, the rotation preferably takes place about a common axis of rotation.

Mechanical adjustment of this kind can be realized in a structurally expedient manner.

It is also advantageous when the first and the second rotor section each have magnetic flux generating means with a first and, respectively, second number of poles whose quotient is an integer.

In general, it is also possible to provide rotor sections whose pole number gives a quotient which is not an integer. If the quotient is an integer, rotation speed fluctuations and unbalance problems can be avoided from the start.

It is particularly advantageous when the first and the second pole numbers are identical.

In this way, the installation space available can be utilized in an optimum manner.

According to a further preferred embodiment, the first and the second rotor section can be rotated with respect to one another through an angle which is less than or equal to 360° divided by the larger or common pole number.

In this way, the adjustment range can be limited, this permitting a comparatively simple actuation system. In addition, a relatively large adjustment range is generally not expedient since the electromagnetic conditions are repeated in the circumferential direction.

A rotor actuator which generates the relative movement between the two rotor sections is also preferably provided.

On account of the provision of a special rotor actuator, a changeover can be made from one relative position to the other relative position in a targeted manner by means of superordinate control electronics.

The rotor actuator is preferably a fluid actuator, in particular a rotary fluid actuator.

Since fluidic drives are often realized, particularly in motor vehicle applications, existing resources can generally be drawn on in this field.

As an alternative to this, it is also possible for the rotor actuator to be an electromotive actuator. In general, it is also feasible to provide an electromagnetic actuator, it being possible in this case for the effect of such an actuator on the rotor flux to be taken into account.

It is also advantageous when the first and the second rotor section are held at least in one of the two relative positions by means of a latching device.

Since the change in the rotor flux is made by superimposition of magnetic forces, magnetic repulsion forces act between the rotor sections at least in one of the two relative positions. A latching device ensures that the set relative position is maintained.

In general, it is possible to realize the latching device by mechanical latching means (ball catches etc.).

However, electromagnetic latching is preferred.

In this case, it is particularly advantageous when identical magnet poles of the first and, respectively, of the second rotor section are situated opposite one another in one of the two relative positions, a mechanical end stop which is designed for this relative position being arranged offset through a small angle, so that the identical magnet poles are not situated exactly opposite one another and the magnetic repulsion forces push one rotor section against the end stop.

In this way, the magnetic repulsion forces are used to hold the rotor sections in this relative position without power being supplied from the outside.

According to a further preferred embodiment, opposed magnet poles of the first and, respectively, of the second rotor section are situated opposite one another in one of the two relative positions, so that the rotor sections are held in this relative position on account of the magnetic attraction forces.

Therefore, no latching means are generally required in this relative position. In particular, no power supply is needed to hold the rotor sections in this relative position.

However, as an alternative, electromagnetic latching can likewise be provided, for example by the rotor sections also being somewhat offset in relation to one another in this relative position, so that the magnetic attraction forces push the rotor sections against a correspondingly provided mechanical end stop.

Overall, it is also advantageous when an intermediate element comprising a non-magnetic, low-friction material is arranged between the first and the second rotor section.

In this way, the rotor sections can be moved with respect to one another with a relatively low outlay of power. Furthermore, the problem of magnets sticking to one another is avoided.

In this case, it is particularly advantageous when the intermediate element is an intermediate sleeve which can be accommodated in a simple manner between two concentric rotor sections.

The intermediate sleeve can be produced, for example, from a plastic material or else from a non-magnetic metal.

According to a further preferred embodiment, the first and/or the second magnetic flux generating means are/is formed such that a total pole number of the rotor can be adjusted.

In this way, the electrical synchronous machine can be operated, for example, with a first pole number or with a second pole number, this being advantageous for some applications.

Overall, it is also preferred when the rotor flux can be mechanically set in an electrical synchronous machine according to the preamble of claim 1.

Overall, the synchronous machine according to the invention can therefore mechanically influence the rotor flux, so that a further degree of freedom is created which can be expediently used to optimize the synchronous machine, for example to increase the rotation speed range, to increase the efficiency or to improve the maximum torque.

The rotor sections can preferably be mechanically adjusted such that power has to be applied only briefly for an adjustment process, and that after this the synchronous machine can operate over a long period of time without a further separate power supply.

It goes without saying that the abovementioned features and those still to be explained below can be used both in the respectively specified combination and also in other combinations or on their own, without departing from the scope of the present invention.

BRIEF DESCRIPTION OF THE SEVERAL VIEWS OF THE DRAWING

Exemplary embodiments of the invention are illustrated in the drawing and will be explained in greater detail in the following description. In the drawing.

DETAILED DESCRIPTION OF THE INVENTION

Figure 1:
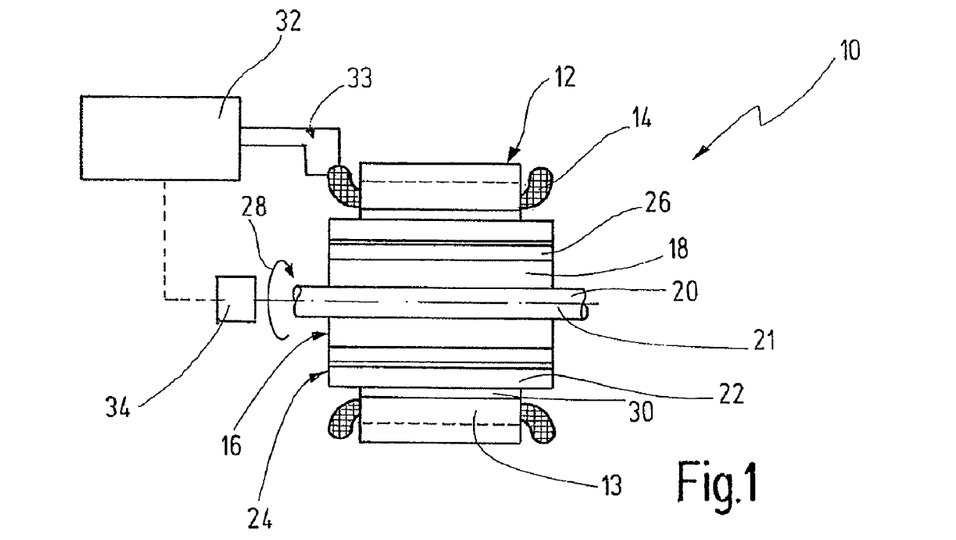
FIG. 1 shows a schematic longitudinal sectional view through a synchronous machine according to a first embodiment of the present invention.

In FIG. 1, a first embodiment of a synchronous machine according to the invention is denoted 10 in general.

The synchronous machine 10 is preferably designed as an electromotive drive, for example in motor vehicle applications. In this field, said synchronous machine can be used as an actuator, but also as a drive unit, for example in hybrid drive units, in pure electromotive drive units etc.

In general, however, it is also feasible to use the synchronous machine 10 as an electrical generator.

The synchronous machine 10 has a stator 12 with a stator yoke 13 on which a winding arrangement 14 is provided. The winding arrangement 14 is used, in a manner which is known per se, to generate a rotating field.

The synchronous machine 10 also has a rotor 16. The rotor 16 contains a rotor yoke 18 which is connected to a shaft 20 in a rotationally fixed manner. The shaft 20 is oriented along an axis 21. The stator 12 and the rotor 16 are arranged concentrically in relation to this axis 21.

In addition, a further rotor section 24 is provided around the rotor yoke 18. First magnetic flux generating means 22 are formed on the further rotor section 24.

The rotor section which is provided around the rotor yoke 18 is called the first rotor section or "hollow rotor" in the present case. The rotor yoke 18 is also called the second rotor section 18 or "solid rotor" in the present case.

The rotation direction of the double-rotor 16, which is formed in this way, in relation to the stator 12 is denoted 28 in FIG. 1. An annular air gap which is provided between the stator 12 and the rotor 16 is denoted 30.

The winding arrangement 14 of the stator 12 is connected to an electronic control device 32 which supplies currents (machine current 33), which vary over time, to the winding arrangement 14 in a manner which is known per se, in order to thus generate a rotating field which rotates in direction 28.

The shaft 20 can also be connected to a rotary angle sensor 34 which measures the respective rotary angle of the shaft 20 (or of the rotor 16) in relation to the stator 12 which is fixed to the housing. The rotary angle sensor 34 can be connected to the control device 32, so that the winding arrangement 14 can be actuated in a controlled manner as a function of the respective rotary angle (or of a variable derived from it, such as the angular speed).

The first rotor section 24 and the second rotor section 18 can be moved relative to one another, to be precise between at least a first and a second relative position.

Accordingly, a rotor flux, which is provided overall by the rotor 16 and with which the rotating field generated by the winding arrangement 14 interacts, can be changed.

In particular, it is thus possible to generate a rotor flux which is high overall, so that the synchronous machine 10 can operate at a high torque. On the other hand, it is possible to reduce the rotor flux in the other relative position, so that the synchronous machine can operate at a high rotation speed.

Although it is preferred when the first magnetic flux generating means 22 are formed by a permanent magnet arrangement, it is also possible to provide DC coils, which are fed via corresponding slip rings, in place of this.

The second magnetic flux generating means 26 are used as magnetic flux influencing means. In general, it is also possible to influence the first magnetic flux generating means 22 by non-magnetic or magnetized means which are provided on the second rotor section 18.

The two rotor sections 18, 24 are preferably rotated with respect to one another in order to set up the two relative positions. However, it is also possible to shift the rotor sections 18, 24 in relation to one another, for example in the axial direction, or to provide individual movable magnetic flux influencing means, for example on the second rotor section 18.

The rotor flux generated by the rotor 16 is a variable which is dependent on the product of the flux density generated in the air gap 30 and the effective cross-sectional area in the air gap.

The magnetic flux generating means and the associated magnetic flux influencing means (for example second magnetic flux generating means 26) can be arranged on the two rotor sections 18, 24 such that a different flux density is generated in each of the two relative positions. As an alternative, the arrangement can be made such that a different cross-sectional area (effective cross-sectional area) is produced in each case.

An embodiment in which the flux density is changed is discussed below with reference to FIG. 2.

Figure 2:
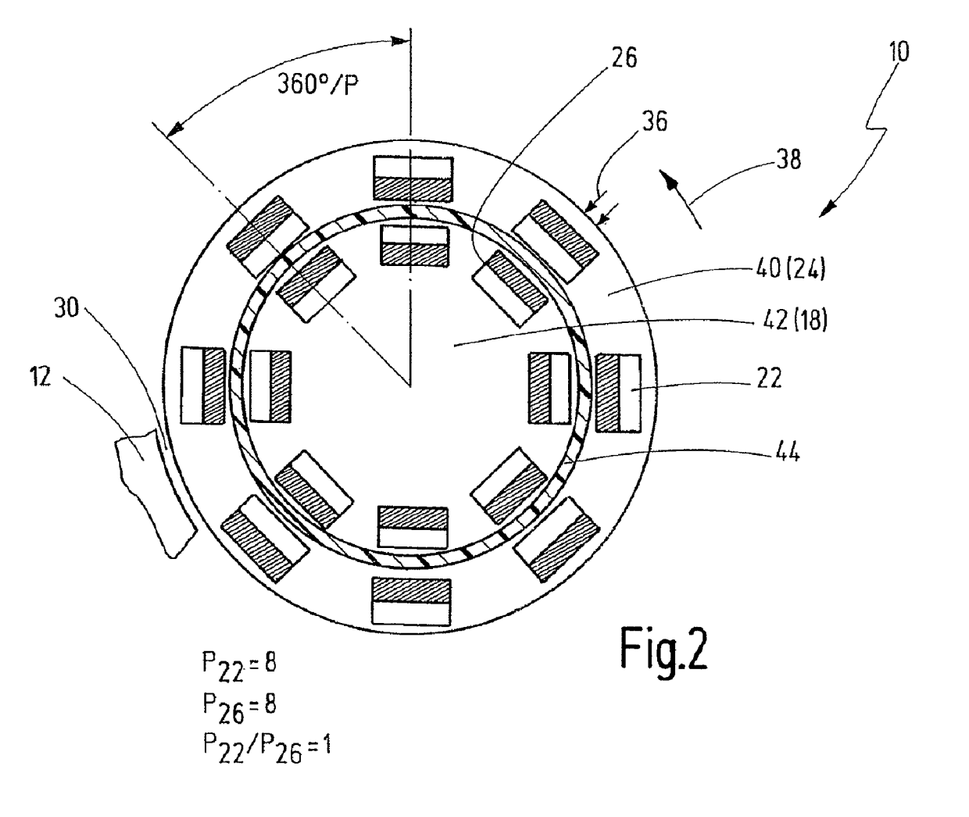
FIG. 2 shows a cross-sectional view of a double-rotor arrangement for an inventive synchronous machine according to a further embodiment of the present invention.

FIG. 2 shows an embodiment of a synchronous machine according to the invention whose design corresponds generally to the design shown in FIG. 1. Identical elements are therefore provided with the same reference symbols. Only the differences are explained in the text which follows.

The synchronous machine 10 of FIG. 2 has a double-rotor arrangement with a radially outer hollow rotor 40 (first rotor section 24) and a radially inner solid rotor 42 (second rotor section 18).

The two rotor sections 40, 42 are separated from one another by a non-magnetic, low-friction intermediate sleeve 44.

FIG. 2 also shows the rotor flux 36 acting in the air gap 30. FIG. 2 also indicates a rotating field 38 which is generated by the winding arrangement 14.

The solid rotor 42 can be moved in relation to the hollow rotor 40 between two positions. The two relative positions, of which one position is shown in FIG. 2, are spaced apart from one another by 360°/p, where p is the pole number.

In the present embodiment, both the hollow rotor 40 and the solid rotor 42 each have eight poles ($p_{22}=p_{26}=8$). The two relative positions are therefore spaced apart from one another by 45°.

The poles of the rotor sections 40, 42 are in each case formed by permanent magnets which are magnetized in the radial direction. In this case, the magnet poles of the permanent magnet arrangements 22, 26 are inverted in the circumferential direction in an alternating manner in each case. In the illustrated relative position, the individual permanent magnets of the permanent magnet arrangements 22, 26 are situated radially one above the other, said permanent magnets in each case being polarized in the same direction. Therefore, the magnetic fluxes generated by the permanent magnets of the permanent magnet arrangements 22, 26 are superimposed (substantially added).

If the two rotor sections 40, 42 are rotated with respect to one another into the second relative position, the individual permanent magnets of the permanent magnet arrangements 22, 26 are again situated radially one above the other, but with an opposite polarity. As a result, the magnetic fluxes are superimposed in such a way that a considerably lower rotor flux 36 is provided in the air gap 30 overall.

This is explained in greater detail below with reference to FIG. 3.

Figure 3A:
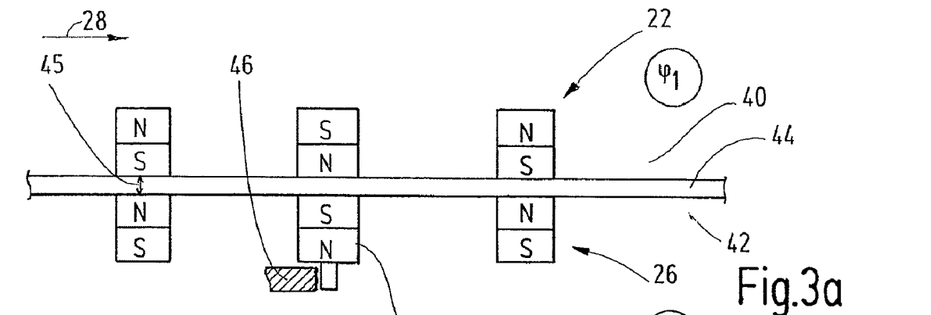
FIG. 3a shows a schematic development of a detail of a double-rotor arrangement according to a further embodiment of the present invention in a first relative position.

In this case, FIG. 3a shows an arrangement as shown in FIG. 2, to be precise in a first relative position $\phi_1$. In this position, the poles, which are situated opposite one another, of the permanent magnets of the permanent magnet arrangements 22, 26 are opposed, so that magnetic attraction forces 45 act between them. Accordingly, this relative position $\phi_1$ is generally maintained on account of these forces 45, even if no power is supplied from the outside. 46 indicates a mechanical stop, but this is not absolutely necessary.

Figure 3B:
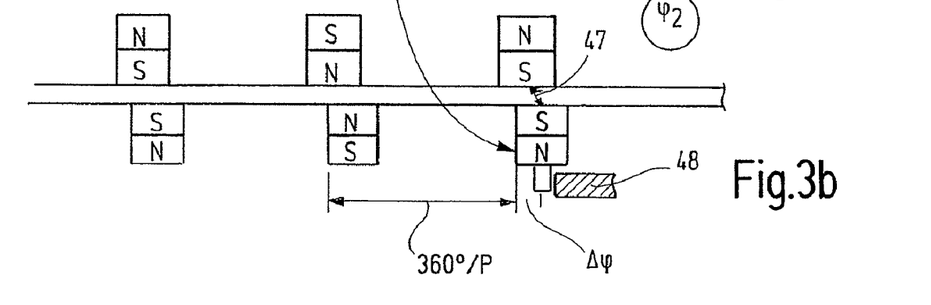
FIG. 3b shows a schematic development of a detail of a double-rotor arrangement according to a further embodiment of the present invention in a second relative position.

In FIG. 3b, the two rotor sections 40, 42 are rotated with respect to one another, to be precise through an angle of $360°/p+\Delta\phi$ in total.

It can be seen that, in this arrangement, substantially identical magnet poles of the permanent magnet arrangements 22, 26 are situated opposite one another. Therefore, magnetic repulsion forces 47 are generated between these magnet poles.

Although it is, in general, also feasible to set up the second relative position $\phi_2$ such that the individual permanent magnets are in each case situated opposite one another (in this case the angular offset would be only 360°/p), mechanical latching means which prevent the magnetic repulsion forces 47 changing the set position would be required in this case if further power supply during long-term operation is to be dispensed with.

In the embodiment illustrated in FIG. 3b, a kind of magnetic latching device is realized by the small additional angular offset $\Delta\phi$.

A mechanical stop 48 which corresponds to the angular position $360°/p+\Delta\phi$ is provided. In this position, the resulting magnetic repulsion forces 47 are oriented in an inclined manner and contain a force component which acts in the circumferential direction and pushes the solid rotor 42 against the mechanical stop 48.

Accordingly, despite the opposing identical magnet poles, the relative position $\phi_2$ which is set in this way is also maintained during long-term operation without further power being supplied.

Figure 4A:
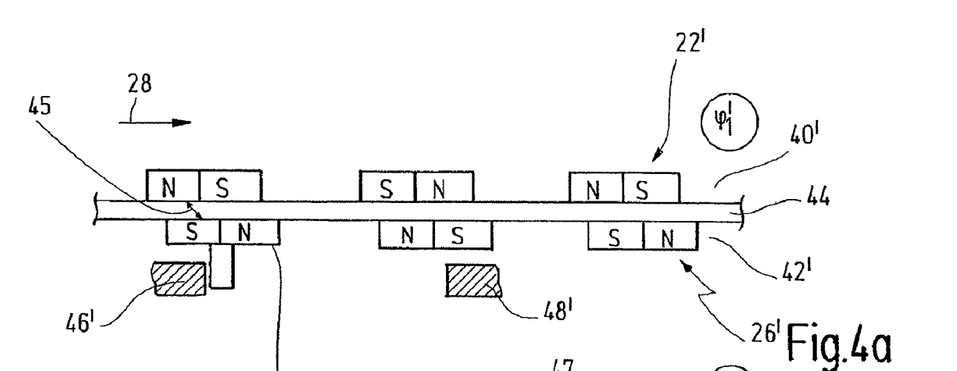
FIG. 4a shows a schematic development of a detail of a double-rotor arrangement according to a further embodiment of the present invention in a first relative position.
Figure 4B:
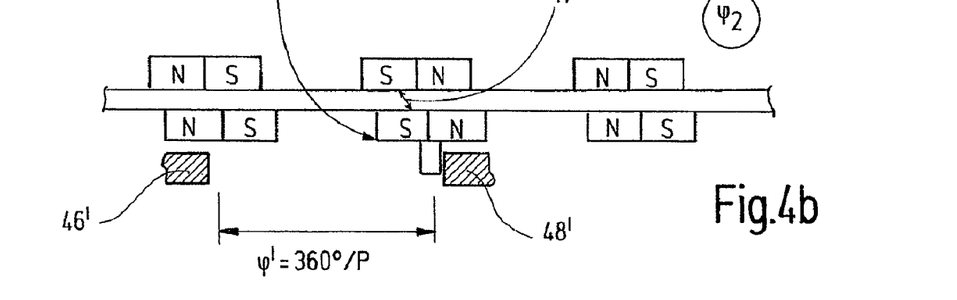
FIG. 4b shows a schematic development of a detail of a double-rotor arrangement according to a further embodiment of the present invention in a second relative position.

FIG. 4 shows an alternative embodiment of a double-rotor arrangement, the illustration corresponding to that of FIG. 3. A hollow rotor 40' has a permanent magnet arrangement 22' in which individual permanent magnets are fixed such that their magnetic axes point in the circumferential direction (rotation direction 28).

The permanent magnets of the permanent magnet arrangement 26' are fixed to the solid rotor 42' in a corresponding manner.

In the present case, two mechanical stops 46', 48' which set up an offset angle region φ' of exactly 360°/p are also provided.

In the position shown in FIG. 4*a*, in which mutually opposed magnet poles are situated opposite one another, the magnetic attraction forces act such that the solid rotor 42' is drawn toward the mechanical stop 46'. Therefore, a defined relative position φ₁' is set up. The somewhat lower degree of coverage is accepted in this case.

In the second relative position φ₂ (FIG. 4*b*), the second mechanical stop 48' is provided exactly as in the embodiment of FIG. 3*b*, so that a magnetic latching device is realized.

Figure 5:
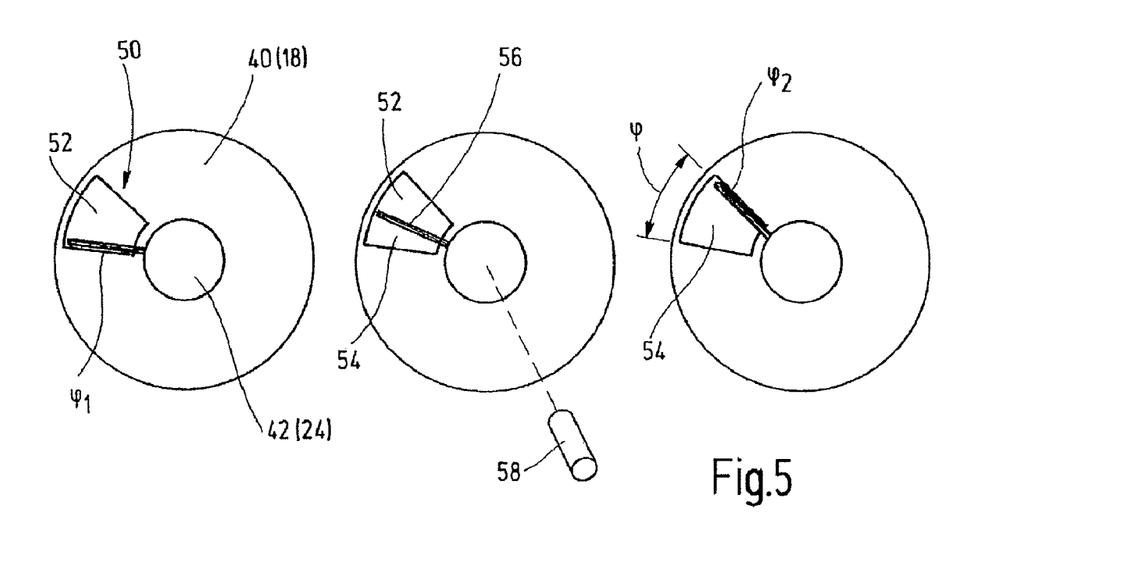
FIG. 5 shows a schematic illustration of a double-rotor arrangement comprising a fluid actuator for setting up the two relative positions.

FIG. 5 shows an example of an actuator for rotating the solid rotor 42 in relation to the hollow rotor 40. The actuator 50 is in the form of a rotary fluid actuator and contains a first chamber 52 and a second chamber 54 which are separated from one another by a rotary piston 56. The rotary piston 56 is fixed to the solid rotor 42. The first relative position φ₁ is set up by supplying fluid to the first chamber 52. When fluid is supplied to the second chamber 54, the solid rotor 42 is rotated to the position shown on the right-hand side in FIG. 5 (second relative position φ₂).

A center position is shown in the center in FIG. 5. Central positions such as this are preferably not used within the scope of the present invention.

58 indicates an alternative rotor actuator 58 in the form of an electric motor which is connected to the solid rotor 42.

Figure 6:
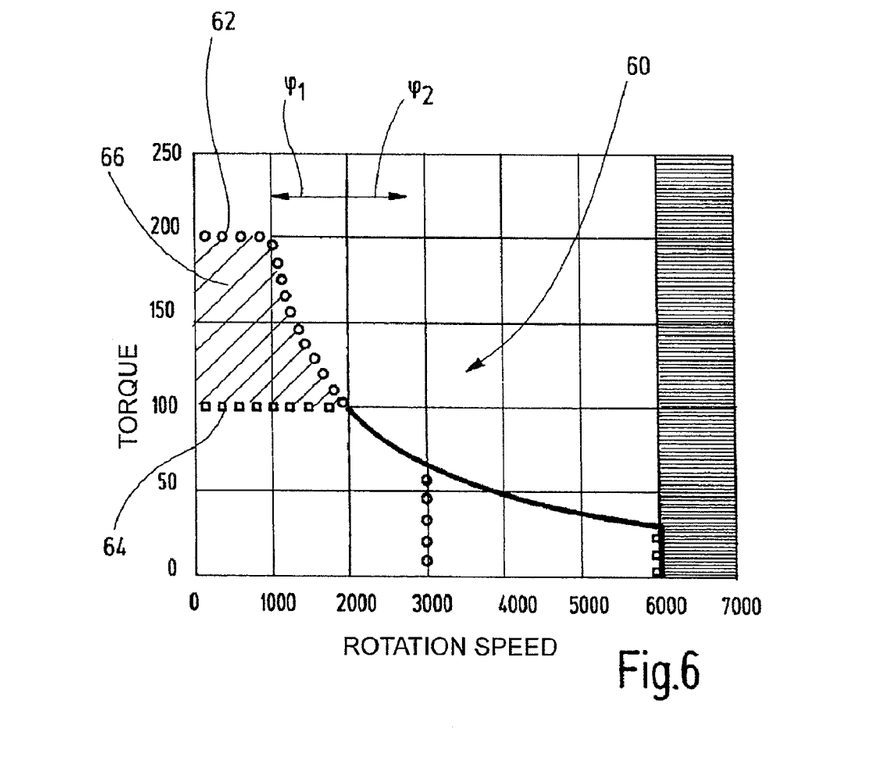
FIG. 6 shows a graph plotting torque against rotation speed of a synchronous machine according to the present invention.

FIG. 6 schematically shows a characteristic curve 60 plotting torque against rotation speed of a synchronous machine 10 according to the invention.

The characteristic curve 60 is made up substantially of two characteristic curve components 62, 64.

The characteristic curve component 62 corresponds to the characteristic curve of a conventional synchronous machine which is optimized for a high torque. It can be seen that the characteristic curve 62 breaks down as early as at a relatively low rotation speed (for example 3000 revolutions/minute). A conventional synchronous machine with such a high starting torque is generally not suitable for relatively high rotation speeds.

The second characteristic curve 64 has a considerably lower starting torque, but can be used up to relatively high rotation speeds (for example 6000 revolutions/minute).

The synchronous machine 10 according to the invention can now realize a characteristic curve 60 which is advantageously made up of the two characteristic curve components 62, 64. A first relative position φ₁ is set up in a region below a specific rotation speed limit (for example 2000 revolutions/minute), so that a high rotor flux 36 is provided and a high torque can be realized. The excess torque achieved in this region is schematically indicated in FIG. 6 (hatched area 66).

The relative position of the two rotor sections is changed (new position φ₂) above the specific rotation speed limit.

As a result, the rotor flux 36 is reduced and the synchronous machine 10 can generally also be used for high rotation speeds, for example up to the shown example of a value of 6000 revolutions/minute.

Figure 7:
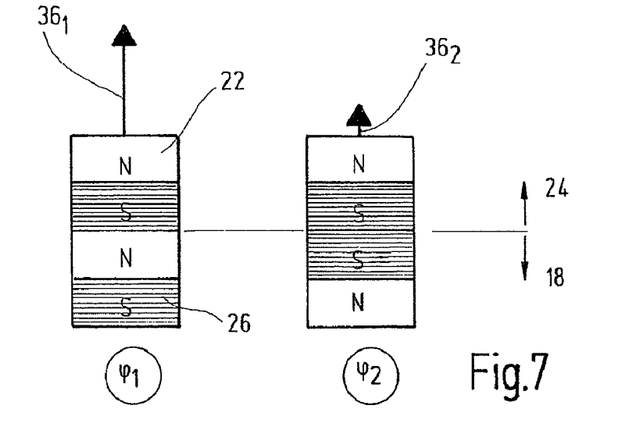
FIG. 7 shows an illustration of two relative positions of a double-rotor arrangement as is shown in FIG. 3.
Figure 8:
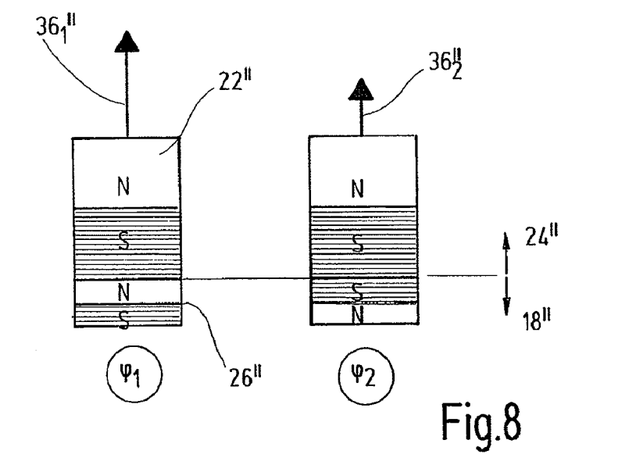
FIG. 8 shows an illustration, which corresponds to FIG. 7, of a modified embodiment of a double-rotor arrangement.
Figure 9:
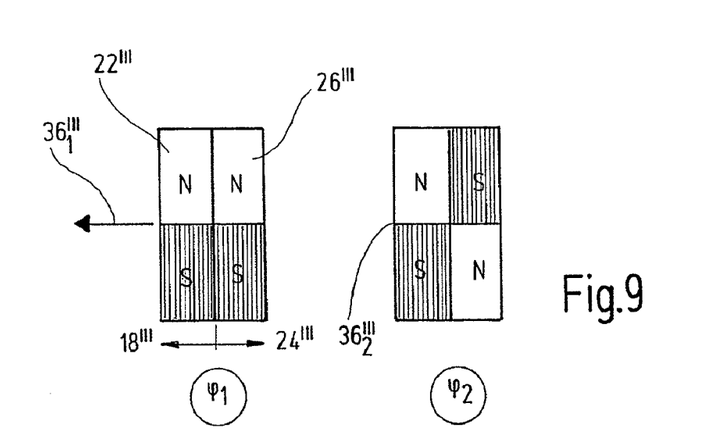
FIG. 9 shows an illustration of the rotor flux in two relative positions in a double-rotor arrangement which is comparable to that of FIG. 4.

The following schematic FIGS. 7 to 9 are used to once again explain how the different rotor flux is produced.

In FIG. 7, this is shown with reference to the synchronous machine 10 of FIG. 2.

In the first relative position φ₁ (left-hand side of FIG. 7), the magnetic fluxes of the permanent magnet arrangements 22, 26 are added to form a relatively high rotor flux $36_1$. In the second relative position φ₂, the magnetic fluxes of the permanent magnet arrangements 22, 26 are partially extinguished on account of the polarity of the arrangement being changed, so that a considerably lower rotor flux $36_2$ is provided.

FIG. 8 shows an alternative embodiment in which comparatively large permanent magnets are provided on the first rotor section 24" and comparatively small permanent magnets are provided on the second rotor section 18".

Accordingly, a high rotor flux $36_1"$ can again be provided overall in the first relative position φ₁. In the second relative position φ₂, a reduced rotor flux $36_2"$ can be provided, this rotor flux, however, not being as considerably low as in the case of FIG. 7.

It goes without saying, in general, that any desired combination of size, magnet strength of the individual permanent magnets, the materials of the used permanent magnets etc. is possible here in order to establish suitable behavior of the synchronous machine 10 in the two relative positions φ₁, φ₂.

FIG. 9 shows a further alternative embodiment whose design corresponds substantially to the design of FIG. 4.

It can be seen that a relatively high rotor flux $36_1'''$ can be provided in one position (corresponding to FIG. 4*a*).

In the second relative position φ₂, the effects of the permanent magnet arrangements 22''', 26''' are substantially extinguished, so that the provided rotor flux $36_2'''$ tends to zero.

Figures 10, 11:
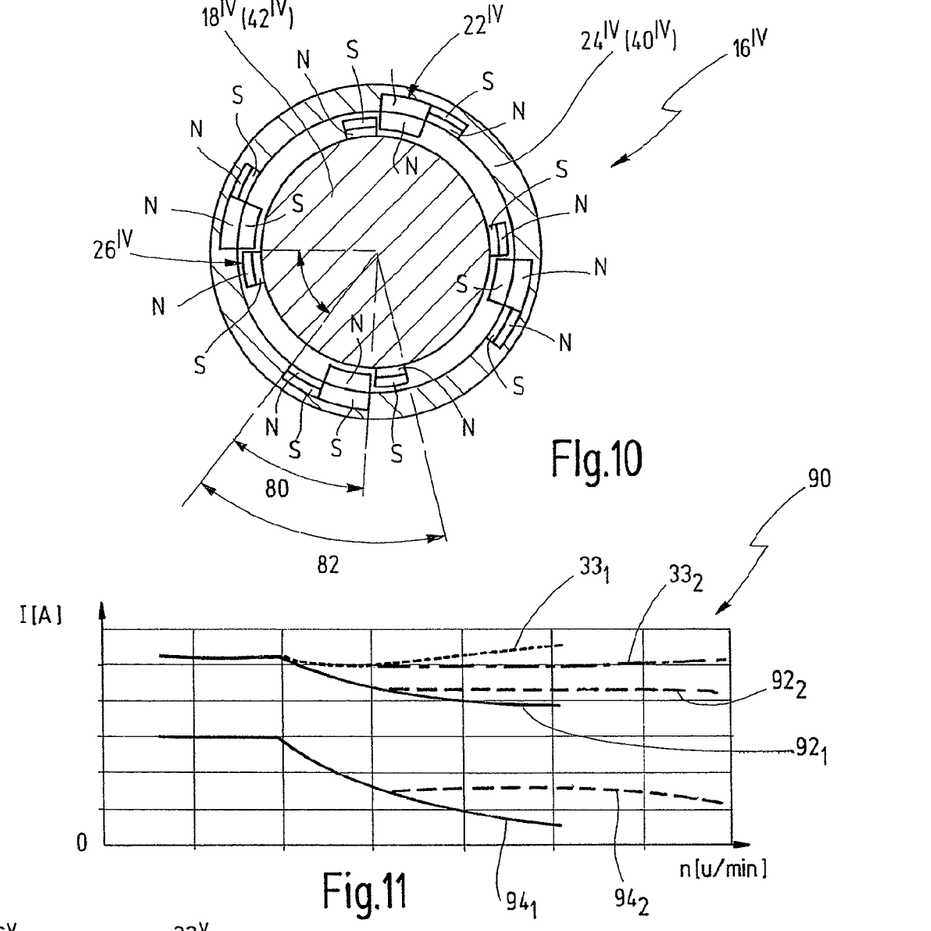
FIG. 10 shows an illustration, which is comparable to FIG. 2, of a double-rotor arrangement for an inventive synchronous machine according to a further embodiment of the present invention.
FIG. 11 shows a graph plotting electric current of the synchronous machine against the rotation speed of the synchronous machine, to be precise different current profiles in each case with and without mechanical field weakening.

FIG. 10 shows an illustration, which is comparable to FIG. 2, of a further alternative embodiment of a double-rotor arrangement $16^{IV}$.

The double-rotor arrangement $16^{IV}$ has a rotor yoke $18^{IV}$ or a solid rotor $42^{IV}$ and a first rotor section $24^{IV}$ or a hollow rotor $40^{IV}$.

First magnetic flux generating means $22^{IV}$ are formed on the hollow rotor $40^{IV}$. These magnetic flux generating means contain first magnets which protrude into a gap between the hollow rotor $40^{IV}$ and the solid rotor $42^{IV}$, and second magnets which are arranged beside said first magnets in the circumferential direction and do not protrude into the gap.

Magnets which likewise project into the gap are formed on the outer circumference of the solid rotor $42^{IV}$.

In a first (not illustrated) position, the magnets of the solid rotor $42^{IV}$ are oriented in the radial direction together with the second magnets of the hollow rotor $40^{IV}$. In this case, a comparatively small first pole width 80 is set up in the circumferential direction.

In the illustrated second relative position, the rotor sections $40^{IV}$, $42^{IV}$ are rotated with respect to one another in such a way that the magnets of the solid rotor $42^{IV}$ are situated adjacent to a respective first magnet, which is arranged offset in the circumferential direction, of the magnetic flux generating means $22^{IV}$ of the hollow rotor $40^{IV}$. A second, wider pole width 82 is set up in this second relative position.

In this embodiment of a double-rotor arrangement $16^{IV}$, the rotor flux can consequently be changed by changing the air gap area which in one case corresponds, for example, to the first pole width 80 and in the other case corresponds, for example, to the second pole width 82.

It should also be noted that the polarity of the magnetic flux generating means $22^{IV}$ and the magnetic flux generating means $26^{IV}$ can be selected as illustrated, a larger rotor flux being set up in the position with the greater pole width 82. In the position with the first pole width 80, a lower rotor flux is provided overall since the magnets of the solid rotor $42^{IV}$ and the second magnets, which are oriented radially to said magnets of the solid rotor, of the hollow rotor $40^{IV}$ are of opposite polarity.

However, an opposite effect can be achieved with another polarity.

FIG. 11 illustrates how the electric currents of the electrical synchronous machine 10 according to the present invention can be changed by mechanical field weakening, that is to say on account of mechanical adjustment of the rotor 16. In the graph 90 shown in FIG. 11, firstly the motor current $33_1$ is illustrated in a first relative position and the motor current $33_2$ is illustrated in a second relative position (with field weakening on account of mechanical adjustment).

In a corresponding manner, graph 90 illustrates a torque-forming current without ($92_1$) and with ($92_2$) mechanically adjusted field weakening, and a field-forming current $94_1$ without field weakening and with field weakening ($94_2$).

FIG. 12 illustrates a further embodiment of a double-rotor arrangement $16^V$ for an electrical synchronous machine according to the present invention.

Figure 12A:
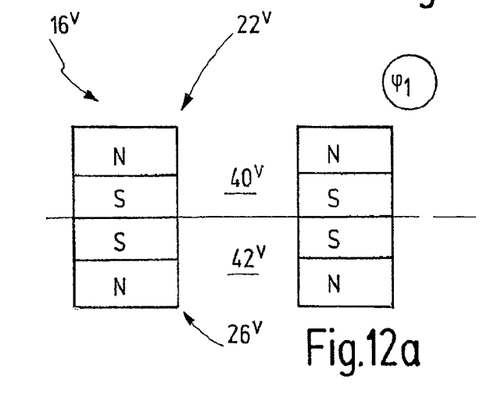
FIG. 12 shows a schematic development of a detail of a double-rotor arrangement according to a further embodiment of the present invention in a first relative position (12a) and a second relative position (12b)
Figure 12B:
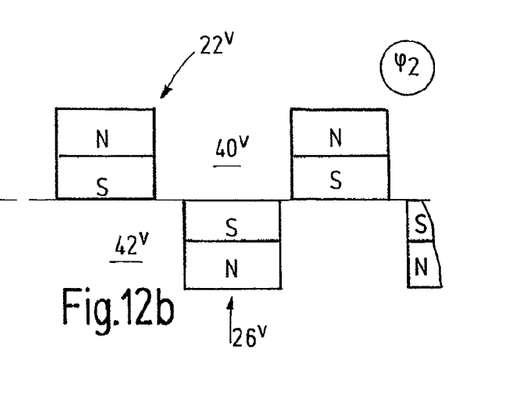

FIG. 12*a* shows a first relative position $\phi_1$ and FIG. 12*b* shows a second relative position $\phi_2$.

The magnetic flux generating means $22^V$ of the hollow rotor $40^V$ and the magnetic flux generating means $26^V$ of the solid rotor $42^V$ are arranged such that they are oriented radially with respect to one another in a first position and in this case are in each case of opposite polarity, so that the poles set up in this way are weakened in each case. In this case, two adjacent poles are in each case of identical polarity in the circumferential direction for example, as illustrated in FIG. 12*a*.

In a second position (FIG. 12*b*), the rotor sections $40^V$, $42^V$ are offset in relation to one another such that the pole number of the rotor $16^V$ is doubled overall. This is because the magnets of the magnetic flux generating means $26^V$ are in each case situated between the magnets of the magnetic flux generating means $22^V$ in the second relative position, so that the pole number is doubled.

In this way, the effective pole number can be set with a double-rotor $16^V$.

Figure 13:
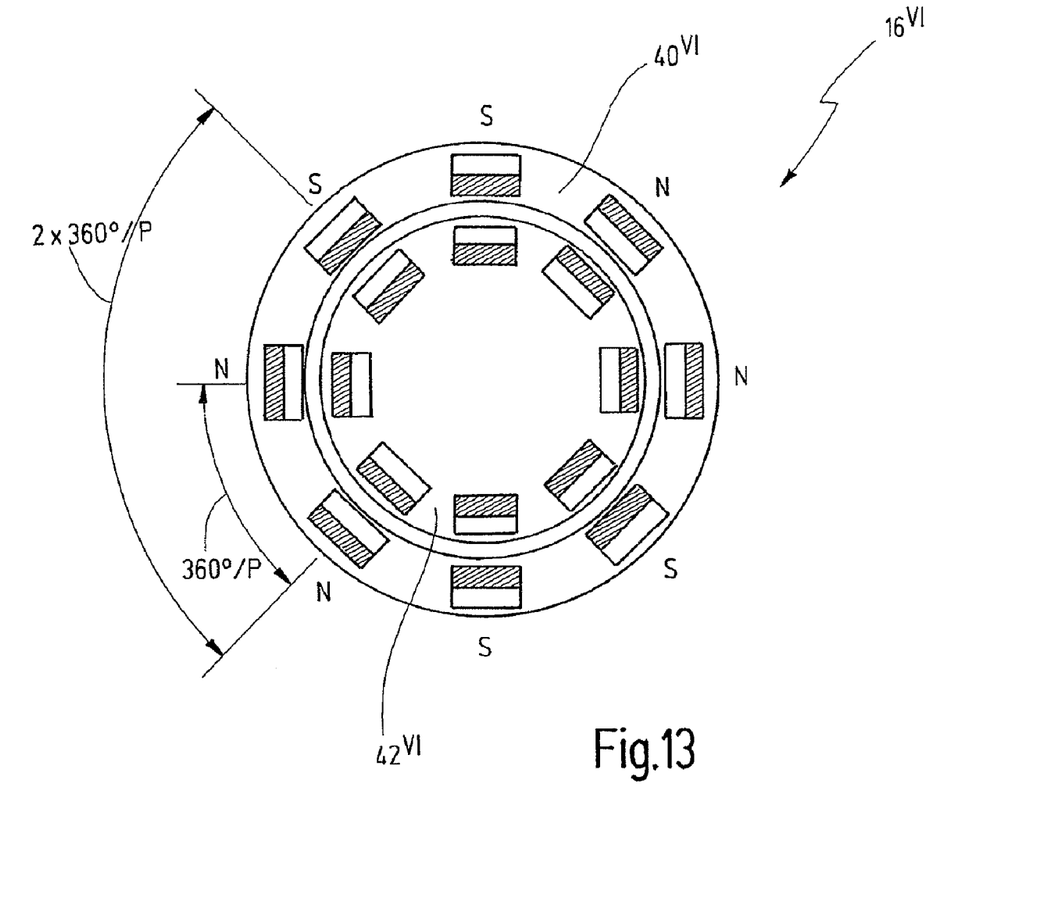
FIG. 13 shows a further alternative double-rotor arrangement.

A further such variant with a double-rotor arrangement $16^{VI}$ with pole number adjustment is shown in FIG. 13.

In this embodiment, the poles of the hollow rotor and of the solid rotor are oriented radially with respect to one another in both relative positions. In a first (illustrated) relative position, the magnets are in each case of identical polarity, so that the poles are all unweakened. The pole sequence in the circumferential direction is N-N-S-S-N-N-S-S, so that effectively only four poles are set up (in each case formed by a pole pair).

In the second relative position, when the poles are rotated in relation to one another through 360°/p, some poles remain unweakened and the others are weakened. The pole sequence is N-s-S-n-N-s-S-n, where small letters in each case indicate a weakened (up to no longer perceptible) rotor flux.

When a second relative position is set up by the rotor sections being rotated through 2*360°/p, the pole sequence n-s-n-s-n-s-n-s would result. All the poles would be weakened. However, the pole number would be doubled.

Overall, all the above-described embodiments share the common feature that the permanent magnets of the permanent magnet arrangement 26 of the solid rotor 42 can be placed in recesses radially from the outside. A binding, as is required for the rotor in conventional EC machines, is not required for the solid rotor since the intermediate sleeve 44 and the hollow rotor 40 which is arranged around the intermediate sleeve 44 prevent the permanent magnets of the arrangement 26 from being radially thrown out.

The abovementioned small offset angle $\Delta\phi$ may be in the range of from 0.5 to 10°, preferably in the range of from 1 to 4°.

Suitable rotor actuators are fluid actuators or electrical adjusting actuators as are known, for example, in the field of camshaft adjustment or propeller adjustment.

The invention claimed is:

1. An electrical synchronous machine comprising a stator which has an electrical winding arrangement for generating a rotating field, and comprising a rotor which has magnetic flux generating means for generating a rotor flux with which the rotating field interacts, wherein the rotor has a first rotor section with first magnetic flux generating means and a second rotor section with magnetic flux influencing means, it being possible to move the two rotor sections relative to one another between at least a first and a second relative position in such a way that the rotor flux provided by the rotor has a different magnitude in the two relative positions, wherein identical magnet poles of the first and, respectively, of the second rotor section are situated opposite one another in one of the two relative positions, a mechanical end stop which is designed for this relative position being arranged offset through a small angle, so that the identical magnet poles are not situated exactly opposite one another and the magnetic repulsion forces push one rotor section against the end stop.

2. The electrical synchronous machine as claimed in claim 1, wherein the magnetic flux influencing means of the second rotor section are formed by second magnetic flux generating means.

3. The electrical synchronous machine as claimed in claim 2, wherein the magnetic flux generating means each have a permanent magnet arrangement.

4. The electrical synchronous machine as claimed in claim 2, wherein the magnetic flux generating means each have a permanent magnet arrangement, and wherein the permanent magnet arrangements are arranged on the first and, respectively, second rotor section such that the rotor flux is changed during the relative movement by changing the flux density.

5. The electrical synchronous machine as claimed in claim 2, wherein the magnetic flux generating means each have a permanent magnet arrangement, and wherein the permanent magnet arrangements are arranged on the first and, respectively, second rotor section such that the rotor flux is changed during the relative movement by changing the air gap area.

6. The electrical synchronous machine as claimed in claim 1, wherein the first rotor section and the second rotor section are arranged so as to be radially interleaved.

7. The electrical synchronous machine as claimed in claim 1, wherein the first rotor section and the second rotor section are arranged coaxially in relation to one another.

8. The electrical synchronous machine as claimed in claim 1, wherein the first and the second relative positions are set up by the first and the second rotor sections being rotated with respect to one another.

9. The electrical synchronous machine as claimed in claim 1, wherein the first and the second rotor sections each have magnetic flux generating means with a first and, respectively, second number of poles whose quotient is an integer.

10. The electrical synchronous machine as claimed in claim 9, wherein the first and the second pole numbers are identical.

11. The electrical synchronous machine as claimed in claim 9, wherein the first and the second rotor sections can be rotated with respect to one another through an angle which is less than or equal to 360° divided by the larger or the common pole number.

12. The electrical synchronous machine as claimed in claim 1, comprising a rotor actuator which generates the relative movement between the two rotor sections.

13. The electrical synchronous machine as claimed in claim 12, wherein the rotor actuator is a fluid actuator, in particular a rotary fluid actuator.

14. The electrical synchronous machine as claimed in claim 12, wherein the rotor actuator is an electromotive or an electromagnetic actuator.

15. The electrical synchronous machine as claimed in claim 1, wherein the first and the second rotor section are held at least in one of the two relative positions by means of a latching device.

16. The electrical synchronous machine as claimed in claim 1, wherein opposed magnet poles of the first and, respectively, of the second rotor section are situated opposite one another in one of the two relative positions, so that the rotor sections are held in this relative position on account of the magnetic attraction forces.

17. The electrical synchronous machine as claimed in claim 1, wherein an intermediate element comprising a non-magnetic, low-friction material is arranged between the first and the second rotor section.

18. The electrical synchronous machine as claimed in claim 17, wherein the intermediate element is an intermediate sleeve.

19. The electrical synchronous machine as claimed in claim 1, wherein at least one of the first and the second magnetic flux generating means are formed such that the total pole number of the rotor can be adjusted.

20. The electrical synchronous machine as claimed in claim 1, wherein the rotor flux can be mechanically set.

* * * * *